(12) United States Patent
Chae

(10) Patent No.: US 6,388,656 B1
(45) Date of Patent: May 14, 2002

(54) REMOTE POSITION DESIGNATION SYSTEM

(76) Inventor: Kwang-muk Chae, 104-1408 Samboo Apt., 4663 Sujin 2-dong, Sujeong-gu, Seongnam-shi, Kyung-do (KR)

( * ) Notice: Subject to any disclaimer, the term of this patent is extended or adjusted under 35 U.S.C. 154(b) by 0 days.

(21) Appl. No.: 09/450,386

(22) Filed: Nov. 29, 1999

(30) Foreign Application Priority Data

Dec. 9, 1998 (KR) .......................................... 98-54578

(51) Int. Cl.$^7$ ................................................. G09G 5/08
(52) U.S. Cl. ....................................... 345/158; 345/157
(58) Field of Search ................................ 348/722, 725, 348/555, 158, 734, 735, 723

(56) References Cited

U.S. PATENT DOCUMENTS

| | | | | |
|---|---|---|---|---|
| 4,796,019 A | * | 1/1989 | Auerbach | 340/709 |
| 5,892,501 A | * | 4/1999 | Kim et al. | 345/158 |
| 5,933,113 A | * | 8/1999 | Newberg et al. | 342/375 |
| 6,014,129 A | * | 1/2000 | Umeda et al. | 345/158 |
| 6,028,888 A | * | 2/2000 | Roux | 375/208 |
| 6,107,957 A | * | 8/2000 | Cramer et al. | 342/124 |
| 6,167,099 A | * | 12/2000 | Radar et al. | 375/347 |

* cited by examiner

Primary Examiner—Vijay Shankar
Assistant Examiner—Nitin Patel
(74) Attorney, Agent, or Firm—Darby & Darby

(57) ABSTRACT

Disclosed is a remote position designation system for designating an optional position on a plane at a place remote from the plane. The remote position designation system includes a transmitter unit including transmitters adapted to transmit, as a position signal, signals of the same frequency, but having different phases, in a simultaneous fashion, respectively, a receiver unit for receiving the signals transmitted from the transmitters of the transmitter unit in the form of a composite signal, amplifying the received composite signal to a saturation level, and conducting a signal processing for the amplified signal to obtain position information associated with a phase shift of the amplified signal from a reference phase, and a control unit for generating a control signal adapted to display a position designated by the position signal from the transmitter unit on a screen, based on the position information from the receiver unit. The remote position designation system is applicable to a variety of electronic appliances such as TVs, computers, VCRs, LDPs, DVD players, VOD systems, cable TV terminals, communication terminals, video game machines for home use, and computers for toddlers. In this case, an easy movement of a curser can be achieved.

9 Claims, 16 Drawing Sheets

FIG. 3a
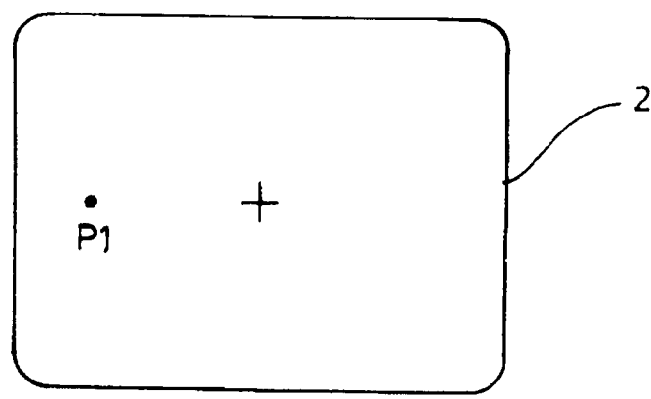
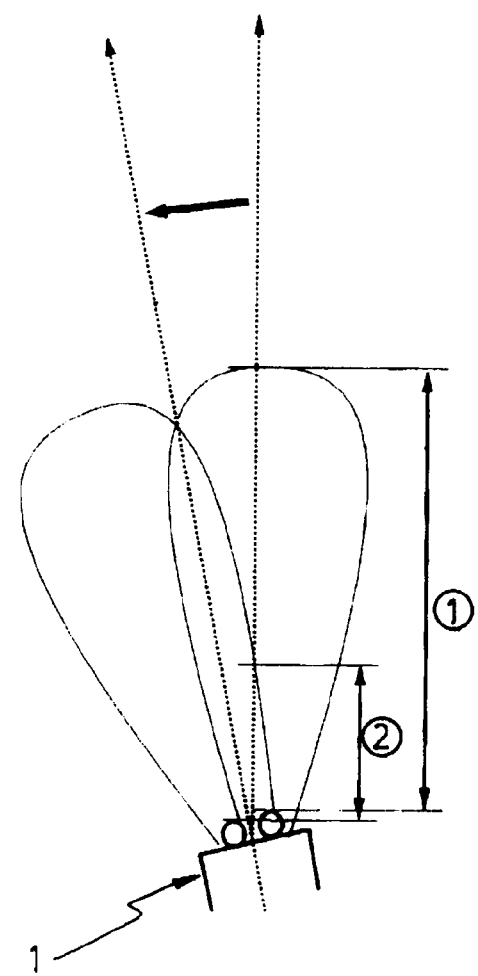

FIG. 3b
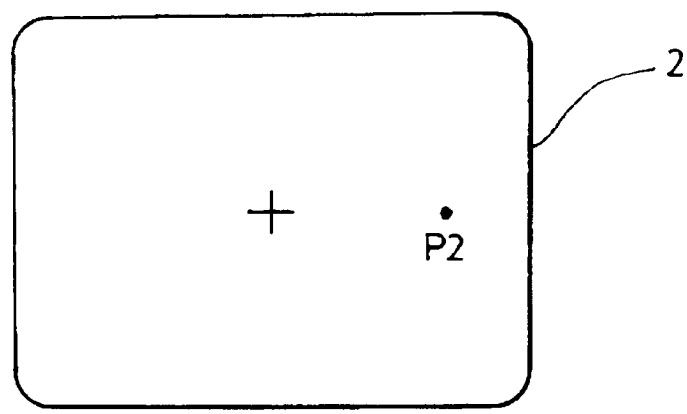
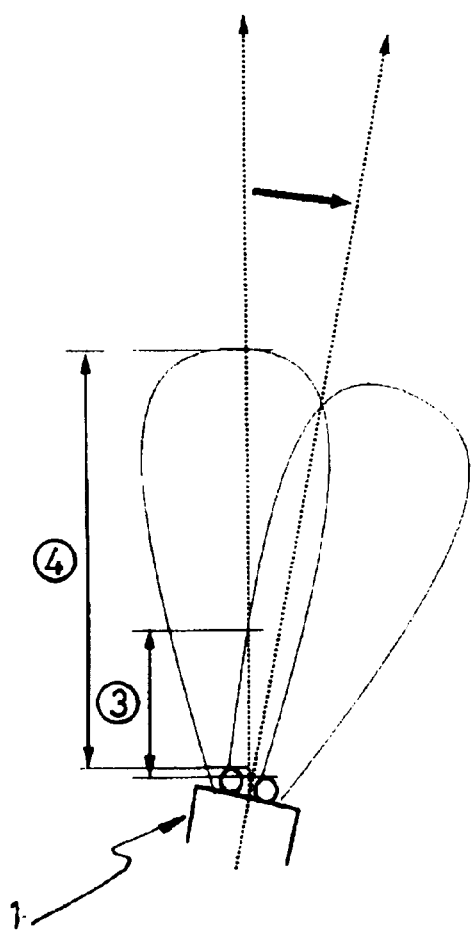

REMOTE POSITION DESIGNATION SYSTEM

BACKGROUND OF THE INVENTION

1. Field of the Invention

The present invention relates to a remote position designation system, and more particularly to a remote position designation system including a transmitter unit adapted to transmit signals of the same frequency, but having different phases, and a receiver unit adapted to receive those signals from the transmitter unit to process them.

2. Description of the Prior Art

Generally, a remote position designation system is applied to a variety of electronic appliances such as TVs, computers, VCRs, LDPs, DVD players, VOD systems, cable TV terminals, communication terminals, video game machines for home use, and computers for toddlers. Such a remote position designation system includes a transmitter unit and a receiver unit. The transmitter unit transmits signals to the receiver unit equipped in an electronic appliance spaced apart from the transmitter unit by a certain distance, using two or more transmitters, respectively. The receiver unit amplifies the signals received thereto in accordance with an amplification method using amplifier circuits or an optical amplification method. The amplified signals are then processed by an analog/digital conversion process. Thereafter, a difference between the converted signals is calculated and then converted into a corresponding value on a coordinate system. In the case in which it is difficult for the remote position designation system to distinguish the signals simultaneously received thereto, the transmitter device transmits those signals at a certain interval of time, respectively, in order to allow the receiver unit to process the signals distinguishable from each other. For this reason, the above mentioned conventional remote position designation system involves an increase in costs in that it is necessary to use very complex circuits requiring a high optical accuracy for processing of received signals. In order to achieve an improvement in accuracy, DC signals, which can be processed using a relatively easy signal processing, are used as transmitting signals. However, it is difficult for such DC signals to be distinguished from peripheral noise, so that use of DC signals may not provide an enhanced position designation accuracy. For this reason, this method is impractical.

The signal processing method used in the above mentioned remote position designation system cannot directly process signals transmitted from any of the existing transmitters. For this reason, it is difficult to simplify the configuration of the remote position designation system. Furthermore, the essential signal processing directly associated with the position designation accuracy is carried out using bulky analog circuits. For this reason, it is difficult to miniaturize the remote position designation system. In addition, it is impossible to reduce the costs.

SUMMARY OF THE INVENTION

Therefore, an object of the invention is to provide a remote position designation system capable of processing signals transmitted from a transmitter unit in a digital fashion by a receiver unit, thereby achieving an easy selection of a desired function from a menu displayed on the screen of an electronic appliance to which the remote position designation system is applied.

In accordance with the present invention, this object is accomplished by providing a remote position designation system for designating an optional position on a plane at a place remote from the plane comprising: a transmitter unit including transmitters adapted to transmit, as a position signal, signals of the same frequency, but having different phases, in a simultaneous fashion, respectively; a receiver unit for receiving the signals transmitted from the transmitters of the transmitter unit in the form of a composite signal, amplifying the received composite signal to a saturation level, and conducting a signal processing for the amplified signal to obtain position information associated with a phase shift of the amplified signal from a reference phase; and a control unit for generating a control signal adapted to display a position designated by the position signal from the transmitter unit on a screen, based on the position information from the receiver unit.

The remote position designation system of the present invention is applicable to a variety of electronic appliances such as TVs, computers, VCRs, LDPs, DVD players, VOD systems, cable TV terminals, communication terminals, video game machines for home use, and computers for toddlers. In this case, an easy movement of a curser can be achieved.

BRIEF DESCRIPTION OF THE DRAWINGS

The above objects, and other features and advantages of the present invention will become more apparent after a reading of the following detailed description when taken in conjunction with the drawings, in which:

FIGS. 3a and 3b are schematic views respectively illustrating a coordinate determination procedure conducted in the position designation system according to the present invention, in which FIG. 3a illustrates a case when a position is designated in the left side of a screen whereas FIG. 3b illustrates a case which a position is designated in the right side of the screen;

DESCRIPTION OF THE PREFERRED EMBODIMENTS

Now, preferred embodiments of the present invention will be described in detail in conjunction with the annexed drawings.

Sine and cosine waves, which are sinusoidal waves having a phase difference of 90° therebetween, have waveforms expressed by basic mathematical units, respectively. Accordingly, such sine and cosine waves can be most simply calculated. In this regard, these sine and cosine waves satisfy a condition given for the simplest one of various waves usable for a transmitter unit according to an embodiment of the present invention.

When sine and cosine waves are composed together, the resultant composite wave exhibits a phase shift due to a variation in amplitude caused by the composition of the sine and cosine waves. This phase shift will now be described.

Generally, when a point having x and y-axis coordinate values x and y rotates by an angle θ, its new coordinate values x' and y' can be expressed by the following rotating expression:

$$\begin{pmatrix} x' \\ y' \end{pmatrix} = \begin{pmatrix} \cos\theta - \sin\theta \\ \sin\theta + \cos\theta \end{pmatrix} \begin{pmatrix} x \\ y \end{pmatrix}$$

From the above matrix expression, the coordinate values x' and y' can be derived as follows:

X'=X cosθ−Y sinθ

Y'=xsinθ−Y cosθ

Using the above expression, a phase shift from basic phases of sin θ and cos θ by ① can be expressed as follows:

cos(θ+α)=cos θ cosα−sin θ sinα   (1)

sin(θ+α)=sin θ cosα+cos θ sinα   (2)

The establishment of the above expressions is well known.

In accordance with a preferred embodiment of the present invention, a transmitter unit uses two transmitters respectively associated with the abscissa and ordinate axes of a plane to transmit frequency signals for detection of a left or right position. Assuming that two frequency signals of different phases are simultaneously transmitted from the above mentioned two transmitters, respectively, a receiver unit provided with a signal processing unit inevitably receives the sum of the two frequency signals as an input signal thereof. In this case, Expression (2) is appropriately used. Where the output signals from the transmitters have a waveform of sin θ and a waveform of cos θ while having the same frequency, respectively, the same result as that expressed in Expression (2) is obtained. This will now be described in more detail.

Figure 1:
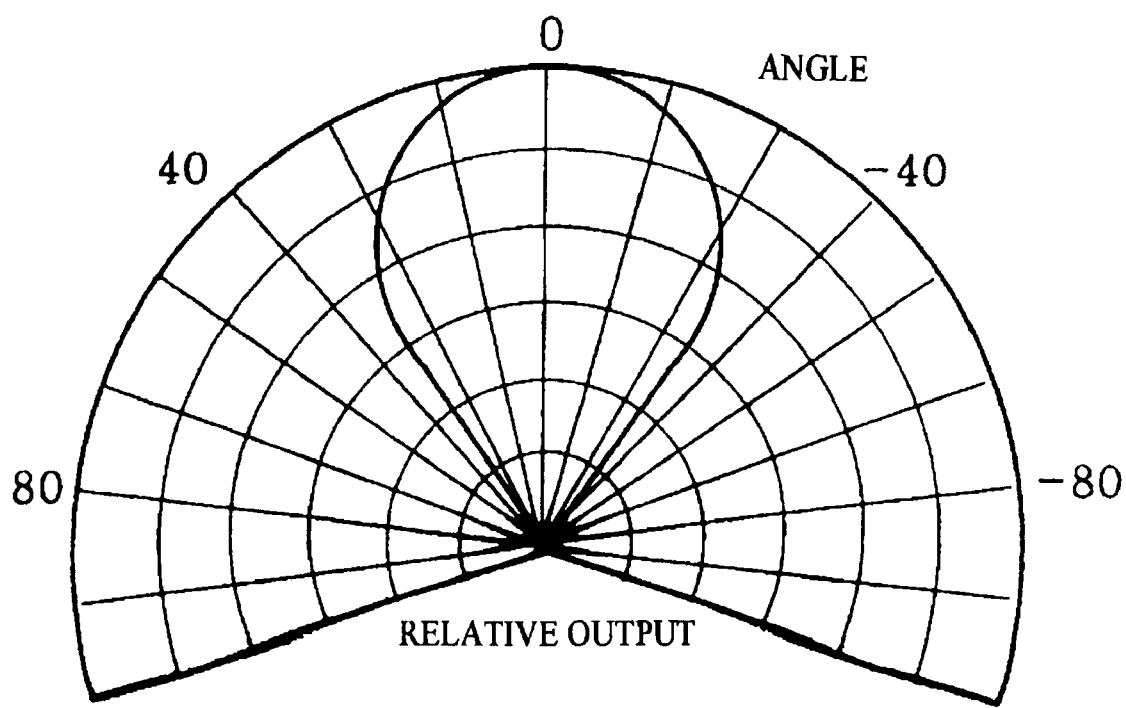
FIG. 1 is a diagram illustrating a directional characteristic curve of a general transmitter unit.

When a receiver unit receives signals having respective waveforms of sin θ and cos θ simultaneously transmitted from two transmitters, each received signal varies in amplitude in accordance with the signal receiving position of the receiver unit with respect to the signal transmission angle of the associated transmitter, as shown in FIG. 1. This amplitude variation results from directional characteristics of the associated transmitter. Assuming that the amplitude of each signal input to the receiver unit is kA for a sine waveform and kB for a cosine waveform, respectively, the resultant composite input signal should satisfy the following condition, based on Expression (2):

Assuming that A=cos α, and B=sin α, kA sin θ+kB cos θ=k sin(θ+α)

where, k represents a constant meeting an optional amplitude.

Accordingly, the following expression is established:

$$\frac{B}{A} = \frac{\sin\alpha}{\cos\alpha} = \tan\alpha$$

Referring to the above mentioned theory applied to the present invention, it can be eventually found that a phase shift α occurs from the sine and cosine waves respectively $$\alpha = \tan^{-1}\frac{B}{A}$$

transmitted from the transmitters with respect to the amplitudes of the sine and cosine waves, as follows:

Reversely, when the phase shift ① of the composite signal is known, it is possible to calculate the ratio between the amplitude A of the signal outputted from the sine-wave transmitter and the amplitude B of the signal outputted from the cosine-wave transmitter. Accordingly, the directional angles of the transmitters directed to the receiver unit can be accurately calculated using the physical characteristics of the transmitters based on the above calculated result, that is, directional characteristic curves of the transmitters.

Where a transmitter device such as a remote controller is used, it may be unnecessary for the transmission angle of each transmitter included in the transmitter device to be accurately aligned with the reception position of the receiver unit. In this case, it is practically meaningless to derive a straight trajectory between the transmission angle of each transmitter and the reception position of the receiver unit, like a shooting trajectory of a direct-firing gun straightly aligned with a target objective. There is no significant problem even when the phase shift ① is directly calculated based on an axial movement distance on a plane, taking into consideration the above proportional expression.

In order to verify the above expression, a description will be made in conjunction with FIGS. 2a to 2d. In accordance with a composition of sine and cosine waves according to the present invention, a composite wave of sine waves to be used as a reference signal is generated along with a composite wave of sine and cosine waves to be used as a position designation signal. The composite wave of sine and cosine waves is depicted in association with three amplitude conditions, that is, the condition in which the sine and cosine waves have the same amplitude (sin=cos), the condition in which the amplitude of the sine wave is higher than that of the cosine wave (sin>cos), and the condition in which the amplitude of the sine wave is lower than that of the cosine wave (sin<cos), respectively.

Figure 2A:
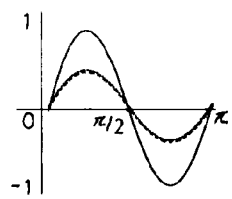
FIGS. 2a to 2d are waveform diagrams respectively illustrating the principle of the generation of a phase shift in a position designation system according to the present invention.

The waveform diagram of FIG. 2a illustrates the case in which both transmitters output sine waves as a reference signal, respectively. In this case, there is no phase shift, irrespective of the output amplitude of each transmitter.

Figure 2B:
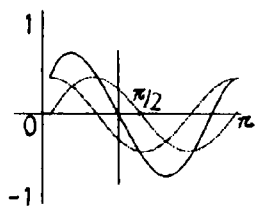
Figure 2C:
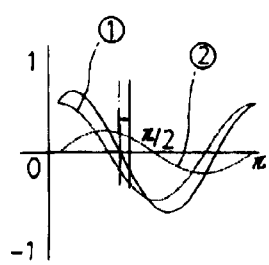
Figure 2D:
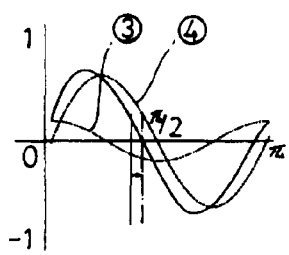

The waveform diagrams of FIGS. 2b to 2d illustrate the cases in which the transmitters output a sine wave and a cosine wave under different amplitude conditions, respectively. The waveform diagram of FIG. 2b illustrates the case of sin=cos. In this case, the composite wave exhibits a phase shift of 45° from both the sine and cosine waves because of $\tan^{-1}1$ ($\tan^{-1}1=45°$). That is, this composite wave has a phase shift corresponding to half the phase difference between the sine and cosine waves. The waveform diagram of FIG. 2c illustrates the case of sin<cos. In this case, the condition of $\tan^{-1}0$ ($\tan^{-1}0=0°$) is ultimately established. Accordingly, the composite wave of FIG. 2c exhibits a phase shift in such a fashion that it ultimately has the same phase as that of the cosine wave. On the other hand, the waveform diagram of FIG. 2d illustrates the case of sin>cos. In this case, the condition of $\tan^{-1}\infty$ ($\tan^{-1}\infty=90°$) is ultimately established. Accordingly, the composite wave of FIG. 2d exhibits a phase shift in such a fashion that it ultimately has the same phase as that of the sine wave. Thus, it can be found that the same results as those expressed in the above expressions are obtained.

In an embodiment of the present invention, transmitter and receiver units using infrared light emitting diodes having a relatively simple circuit configuration are used.

Generally, a considerably complex physical circuit should be used to generate sinusoidal waves respectively having a sine waveform and a cosine waveform.

When a square wave passes through a bandpass filter associated with the frequency of the square wave, only a sine component of the square wave, which is a basic wave component, is left. Using this principle, square waves respectively having a sine phase and a cosine phase are initially generated from the transmitter unit in accordance with the embodiment of the present invention. These square wave signals are received in the receiver unit which, in turn, filters the received square wave signals using bandpass filters respectively associated with the frequencies of the square wave signals. Accordingly, it is possible to obtain the same effect as in the case in which sinusoidal waves respectively having a sine waveform and a cosine waveform are received. In this case, the phase shift of a composite signal generated by a composition of the filtered signals is the same as that calculated using the above calculating expression.

FIGS. 3a and 3b schematically illustrate a coordinate determination procedure for a remote position designation system according to the present invention. FIG. 3a is a coordinate determination procedure for determining coordinate values of a point at the left side of a screen whereas FIG. 3b is a coordinate determination procedure for determining coordinate values of a point at the right side of the screen. When the transmitter unit 1 transmits signals of a certain frequency respectively having sine and cosine waveforms to a screen 2 in a state shifted left from the center of the screen 2 by a certain angle, as shown in FIG. 3a, the resultant composite signal received in the receiver unit exhibits a left phase shift from the center of a basic composite wave because the sine wave, namely, the left signal, and the cosine wave, namely, the right signal, have a relation of sin<cos due to their specific directional characteristic curves, as shown in FIG. 2c. In this case, accordingly, a point P1 shifted left from the center of the screen 2 is designated.

On the other hand, when the transmitter unit 1 transmits the above mentioned signals to the screen 2 in a state shifted right from the center of the screen 2 by a certain angle, as shown in FIG. 3b, the resultant composite signal received in the receiver unit exhibits a right phase shift from the center of the basic composite wave because the sine wave, namely, the left signal, and the cosine wave, namely, the right signal, have a relation of sin>cos due to their specific directional characteristic curves, as shown in FIG. 2c. In this case, accordingly, a point P2 shifted right from the center of the screen 2 is designated.

The waveforms ①, ②, ③, and ④ shown in FIGS. 2c and 2d correspond to portions ①, ②, ③, and ④ of the directional characteristic curves shown in FIGS. 3a and 3b and associated with the signals transmitted from the transmitter unit, respectively.

Figure 4:
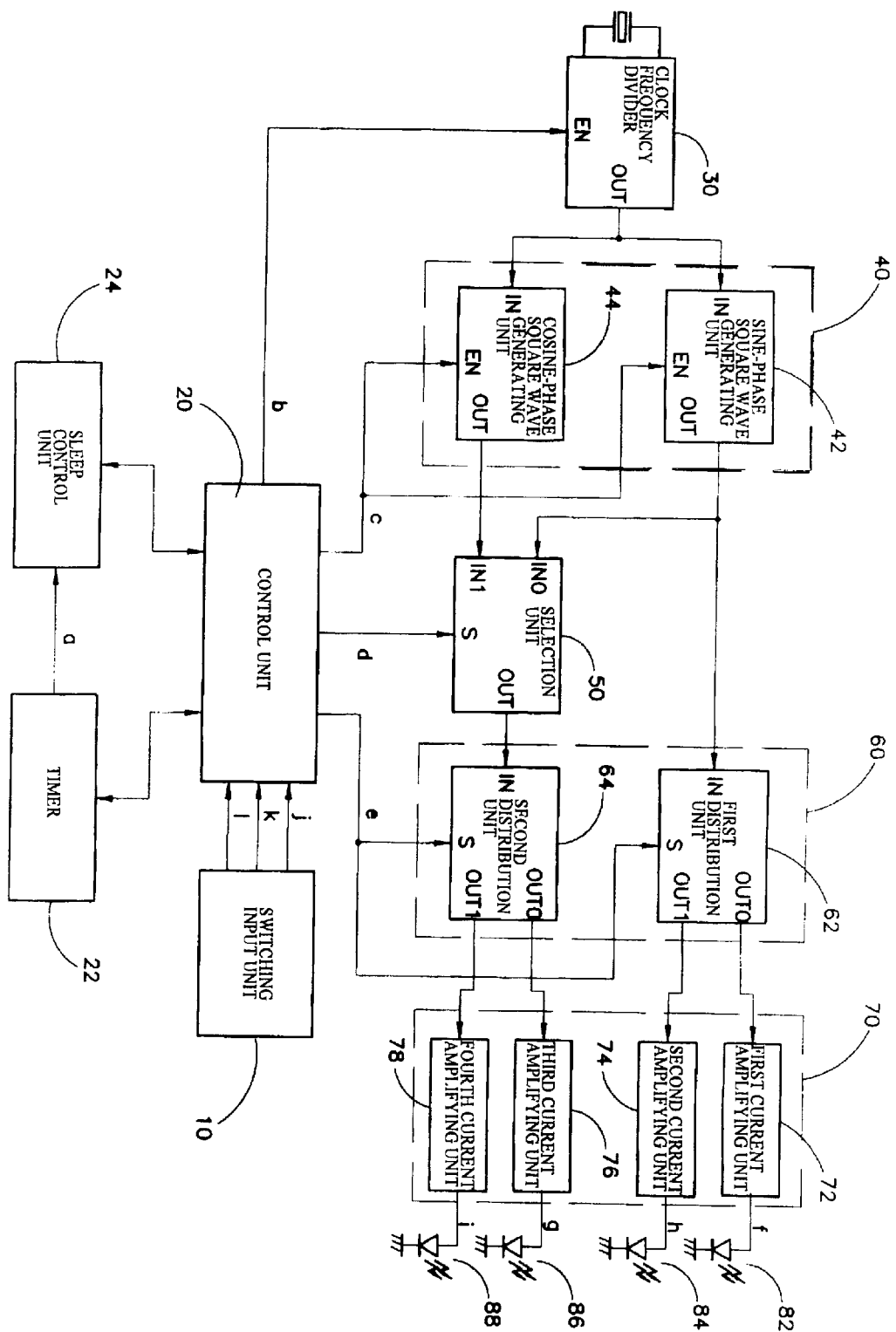
FIG. 4 is a block diagram illustrating a transmitter unit included in the position designation system of the present invention.

FIG. 4 is a block diagram illustrating the transmitter unit 1 included in the remote position designation system according to the present invention. In FIG. 4, the reference numeral "10" denotes a switching input unit adapted to output a predetermined number of control signals (three control signals in the illustrated embodiment) to a control unit 20.

The control unit 20 receives the control signals from the switching input unit 10, thereby outputting control signals to a clock frequency divider 30, a square wave generating unit 40, a selection unit 50, and a distribution unit 60, respectively. This will be described hereinafter.

The reference numeral "22" denotes a timer adapted to generate clocks for timing. The reference numeral "24" denotes a sleep control unit.

The clock frequency divider 30 is activated by a control signal from the control unit 20 applied to its enable terminal EN, thereby outputting a clock signal.

The square wave generating unit 40 includes a sine-phase square wave generating unit 42 and a cosine-phase square wave generating unit 44, each of which is activated by a control signal from the control unit 20 applied to its enable terminal EN. In their activated states, the sine and cosine-phase square wave generating units 42 and 44 generate square waves respectively having a sine phase and a cosine phase in sync with the clock from the clock frequency divider 30 received at their input terminals IN. The sine and cosine-phase square waves generated from the sine and cosine-phase square wave generating units 42 and 44 have the same frequency as the carrier frequency of carrier signals outputted from the existing transmitters in order to allow the remote position designation system to have a compatibility with the existing transmitters and receivers.

The selection unit 50 receives a control signal from the control unit 20 at its selection terminal S. Based on the control signal from the control unit 20, the selection unit 50 outputs a selected one of the output signals from the sine and cosine-phase square wave generating units 42 and 44 respectively received at its input terminals IN0 and IN1.

The distribution unit 60 includes a first distribution unit 62 and a second distribution unit 64 respectively coupled at their input terminals IN to the output terminal OUT of the sine-phase square wave generating unit 42 and the output terminal OUT of the selection unit 50. The first distribution unit 62 has a selection terminal S to which a control signal from the control unit 20 is applied. In response to the control signal from the control unit 20, the first distribution unit 62 outputs a signal adapted to select one of left and right transmitters 82 and 86. The second distribution unit 64 has a selection terminal S to which a control signal from the control unit 20 is applied. In response to the control signal from the control unit 20, the second distribution unit 64 outputs a signal adapted to select one of upper and lower transmitters 84 and 88.

The reference numeral "70" denotes a current amplifying unit which includes a first current amplifying unit 72 and a second current amplifying unit 74 respectively coupled to output terminals OUT0 and OUT1 of the first distribution unit 62. The current amplifying unit 70 also includes a third current amplifying unit 76 and a fourth current amplifying unit 78 respectively coupled to output terminals OUT0 and OUT1 of the second distribution unit 64. The first through fourth current amplifying units 72, 74, 76, and 78 transmit infrared signals to the transmitters 82, 84, 86, and 88, each of which is coupled at one terminal thereof to an associated one of the current amplifying units while being grounded at the other terminal thereof. Each of the transmitters 82, 84, 86, and 88 is an infrared transmitter for emitting an infrared light beam in response to an infrared signal applied thereto.

Figure 5A:
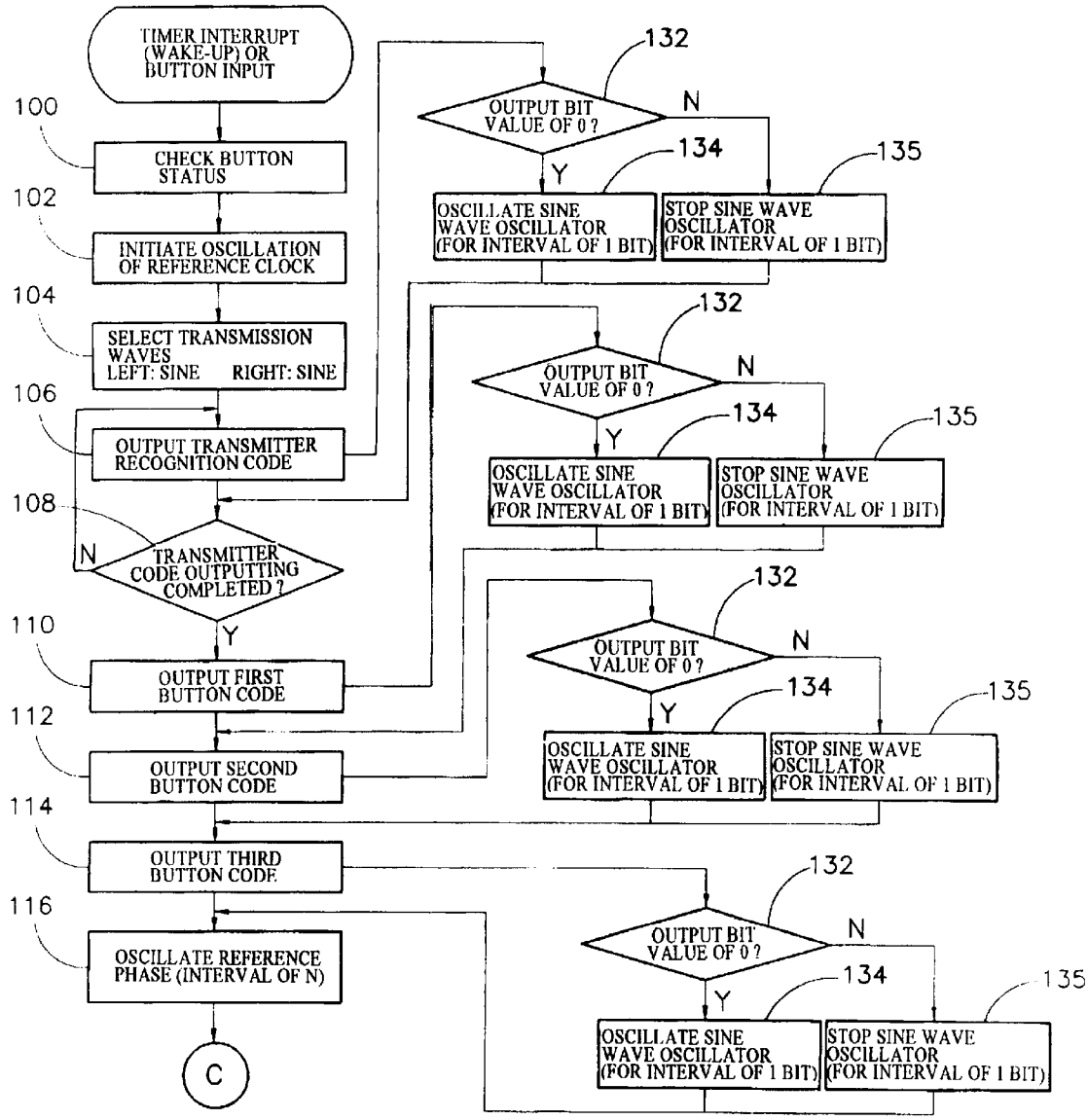
FIGS. 5a and 5b are flow charts respectively illustrating an operation of the transmitter unit.
Figure 5B:
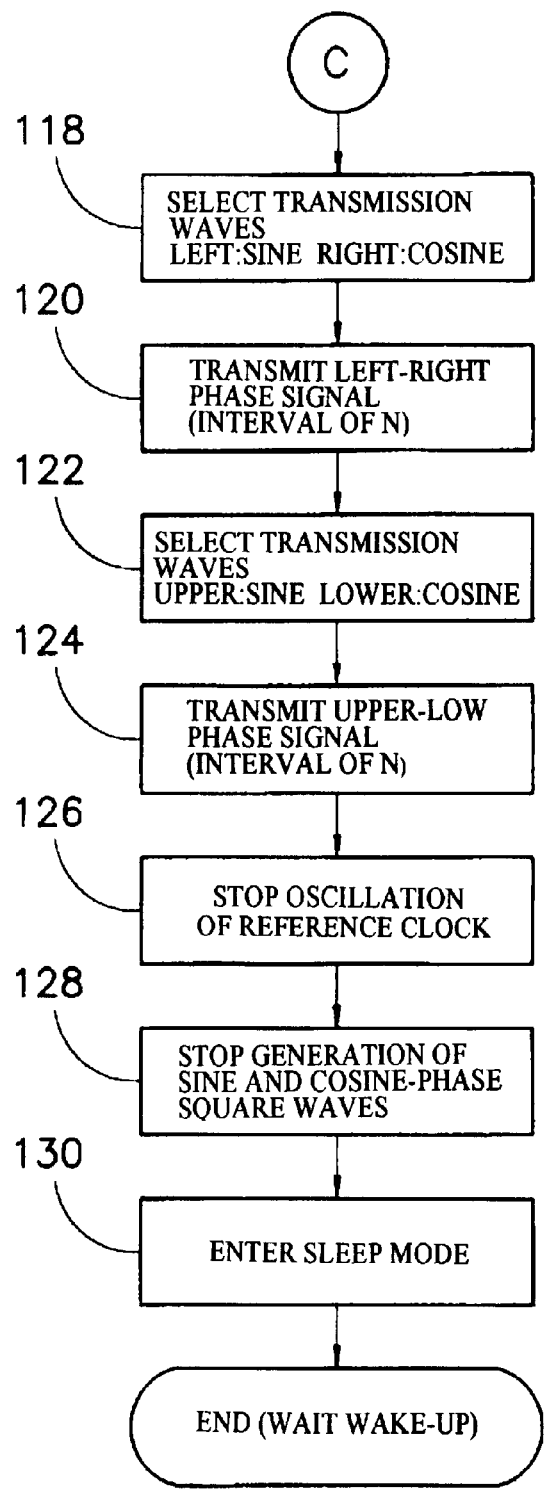

FIGS. 5a and 5b are flow charts illustrating an operation of the transmitter unit in the remote position designation system according to the present invention, respectively. As shown in FIGS. 5a and 5b, when the control unit 20 receives a button input from the switching input unit or a timer interrupt signal, namely, a wake-up signal, it checks the received signal (Step 100). Thereafter, the control unit 20 outputs a control signal to the clock frequency divider 30 to initiate oscillation of reference clocks (Step 102). The control unit 20 also outputs control signals to respective selection terminals S of the selection unit 50 and distribution unit 60 so as to allow a sine-phase square wave to be outputted from selected ones of the transmitters (the left and right transmitters 82 and 86 in the illustrated case) (Step 104).

The control unit 20 also outputs a transmitter recognition code, as square wave oscillation control signal, to the square wave generating unit 40 (Step 106). It is then determined whether or not the transmitter recognition code has a bit value of 0 (Step 132). Where the transmitter recognition code has a bit value of 0, the sine-phase square wave generating unit 42 generates sine-phase square waves for a period of time corresponding to one bit (Step 134). When the transmitter recognition code has not the bit value of 0, the generation of sine-phase square waves from the sine-phase square wave generating unit 42 is stopped for a period of time corresponding to one bit (Step 135). In accordance with the controlled generation of the sine-phase square wave, the transmitter recognition code is outputted.

Thereafter, it is determined whether or not the outputting of the transmitter recognition code is completed (Step 108). Where the outputting of the transmitter recognition code is complete, the control unit 20 outputs a first button code indicative of the status of a first button (Step 110). It is then determined whether or not the first button code has a bit value of 0 (Step 132). Based on the result of the determination for the first button code, the procedure for generating sine-phase square waves or stopping the generation of sine-phase square waves is executed (Step 134 or 135). Subsequently, the control unit 20 outputs a second button code indicative of the status of a second button (Step 112). It is then determined whether or not the second button code has a bit value of 0 (Step 132). Based on the result of the determination for the second button code, the procedure for generating sine-phase square waves or stopping the generation of sine-phase square waves is executed (Step 134 or 135). Subsequently, the control unit 20 outputs a third button code indicative of the status of a third button (Step 114). It is then determined whether or not the button code has a bit value of 0(Step 132). Based on the result of the determination for the button code, the procedure for generating sine-phase square waves or stopping the generation of sine-phase square waves is executed (Step 134 or 135). An increased number of button codes indicative of the statuses of buttons may be designated.

Thereafter, a reference phase transmission is executed for a predetermined period of time N (Step 116). When the input terminal IN1 of the selection unit 50 is activated in response to a control signal from the control unit 20 after the reference phase transmission, the selection unit 50 selects a cosine waveform as an output waveform. Accordingly, the output waveforms of the transmitters are selected in such a fashion that the left transmitter 82 transmits the sine wave outputted from the sine-phase square wave generating unit 42 whereas the right transmitter 86 transmits the cosine wave outputted from the sine-phase square wave generating unit 44 (Step 118). After the selection of output waveforms, a left-right phase transmission is conducted for another period of time N (Step 120). Thereafter, the output terminals OUT1 of the first and second distributing units 62 and 64 are activated. Accordingly, the output waveforms of the transmitters are selected in such a fashion that the upper transmitter 84 transmits the sine wave outputted from the sine-phase square wave generating unit 42 whereas the lower transmitter 88 transmits the cosine wave outputted from the sine-phase square wave generating unit 44 (Step 122). After the selection of output waveforms, an upper-lower phase transmission is conducted for another period of time N (Step 124). After completion of the upper-lower phase transmission, the oscillation of reference clocks is stopped (Step 126). In this state, the generation of sine and cosine-phase square waves is stopped (Step 128). When the control signal applies a control signal to the sleep control unit 24 in response to the stopping of the square wave generation, the transmitter unit enters a sleep mode (Step 130). Thus, the transmitter unit is in a stopped state.

Figure 6:
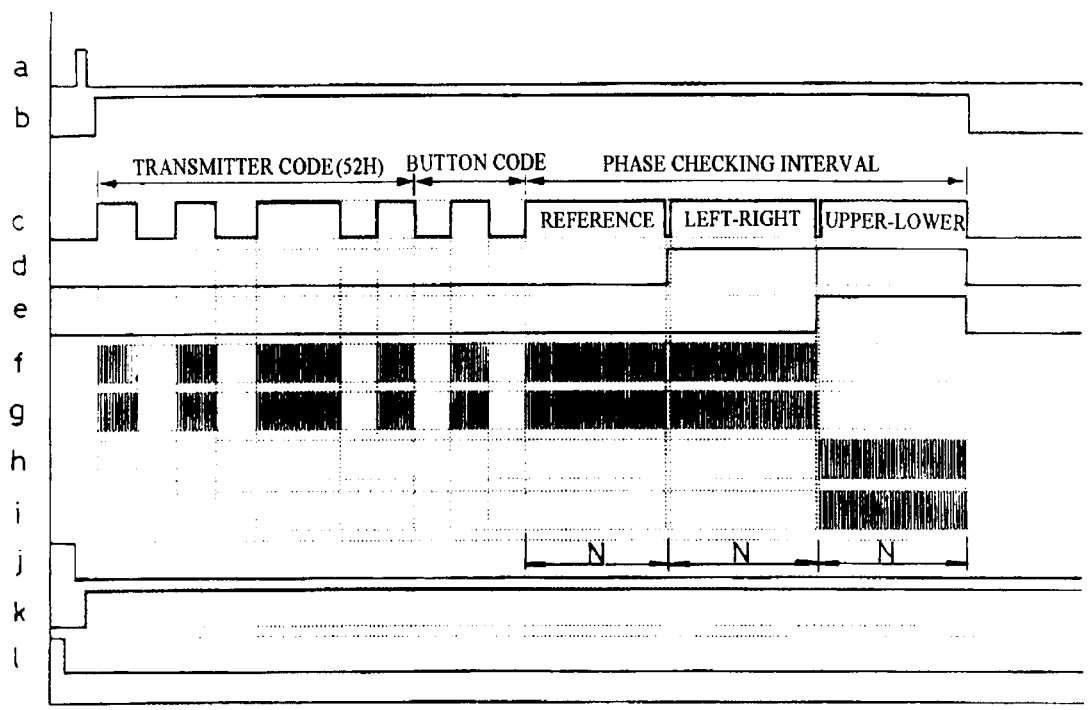
FIG. 6 is a timing diagram of control operations conducted in the transmitter unit of FIG. 4.
Figure 7A:
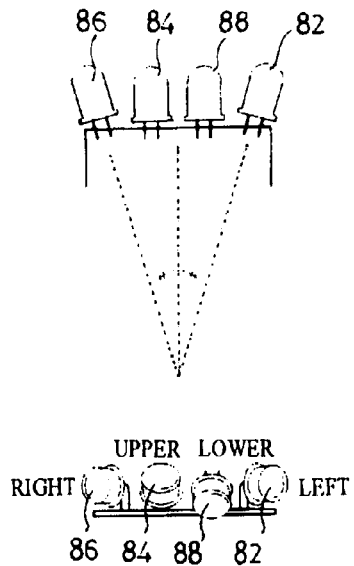
FIGS. 7a and 7b are perspective views respectively illustrating the arrangement of transmitters included in the transmitter unit of FIG. 4.
Figure 7B:
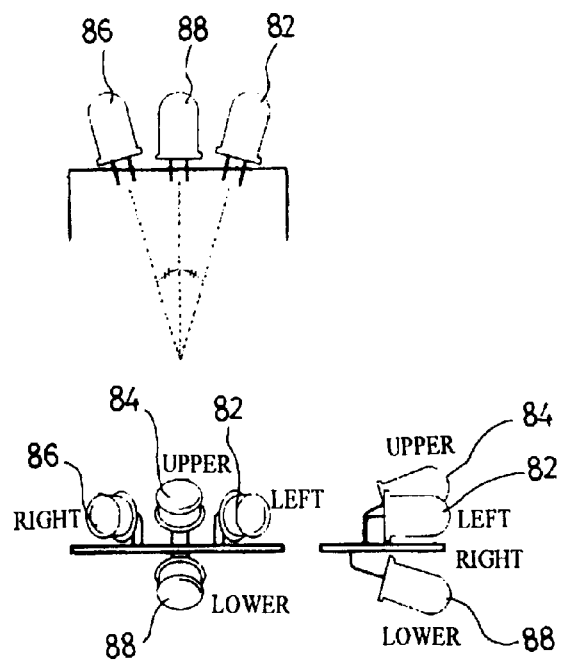

FIG. 6 is a timing diagram of control operations conducted in the transmitter unit of FIG. 4. In FIG. 6, the reference character "a" denotes a timing signal, "b" a reference clock control signal outputted from the control unit 20, and "c" a square wave generation control signal adapted to control the square wave generating unit 40 along with the reference clock control signal b, respectively. The square wave generation control signal c has a variety of signal intervals including a transmitter code interval, a button code interval, and a phase checking interval. The phase checking interval includes a reference phase checking interval, a left-right phase checking interval, and an upper-lower phase checking interval.

In FIG. 6, the reference character "d" denotes a transmitter waveform selection control signal outputted from the control unit 20, and the reference character "e" denotes a selection control signal for selection of left and right transmitters or upper and lower transmitters. Also, the reference characters "f" and "h" denote frequency signals respectively outputted from the first and third current amplifying units 72 and 76 whereas the reference characters "g" and "i" denote frequency signals respectively outputted from the second and fourth current amplifying units 74 and 78.

In FIG. 6, the reference characters "j", "k", and "l" denote control signals outputted from the switching input unit 10, respectively.

The transmitters 82, 84, 86, and 88 of FIG. 4 are arranged in pairs on a horizontal line and a vertical line while being inclined from the associated lines by the same angle, respectively.

As mentioned above, the transmitters 72, 84, 86, and 88 comprise infrared light emitting diodes, respectively. The infrared light emitting diodes of each transmitter pair serve to transmit square waves of the same frequency having different phases, respectively. However, these infrared light emitting diodes may be configured to transmit sinusoidal waves, triangular waves, saw tooth waves, or waves of other shapes, instead of square waves.

Waves of the same phase to be used for a measurement of a reference phase are transmitted from the above mentioned transmitters comprising infrared light emitting diodes. Subsequently, the transmitters transmit waves of different phases or additionally transmit waves of the same phases following the waves of different phases in order to measure the reference phase. Thus, the transmitters transmit reference signals and position designating signals for detection of a phase shift at intervals of time.

Figure 8:
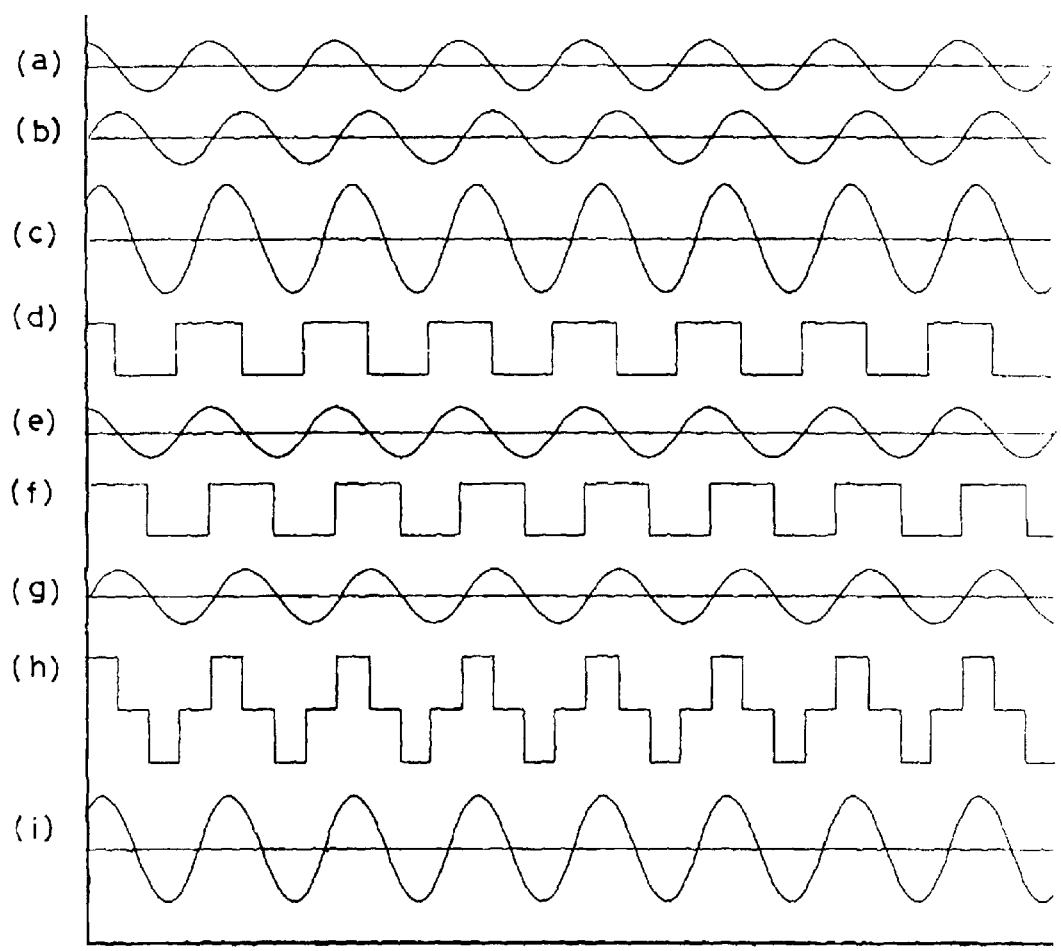
FIG. 8 is a waveform diagram illustrating the principle of a substitution of square waves for sinusoidal waves in accordance with the present invention.

FIG. 8 is a waveform diagram illustrating theoretical sinusoidal waves and a composite wave of the theoretical sinusoidal waves, square waves according to the present invention, and a composite wave of the square waves, along with sinusoidal waves respectively obtained after passing the square waves and the composite wave of the square waves through a bandpass filter, respectively. Referring to FIG. 8, it can be found that a sinusoidal wave obtained after passing a square wave through a bandpass filter has the same phase as that of an associated theoretical sinusoidal wave.

In FIG. 8, the reference character "a" denotes a cosine wave, "b" a sine wave, and "c" a composition wave of the cosine and sine waves, respectively.

In FIG. 8, the reference character "d" denotes a cosine-phase square wave practically used in accordance with the present invention, and the reference character "e" denotes a sinusoidal wave obtained after processing the cosine-phase square wave d using a bandpass filter in a receiver unit as described hereinafter. Also, the reference character "f" in FIG. 8 denotes a sine-phase square wave practically used in accordance with the present invention, and the reference character "g" denotes a sinusoidal wave obtained after processing the sine-phase square wave f using a bandpass filter in the receiver unit as described hereinafter. In FIG. 8, the reference character "h" denotes a composite wave of the square waves d and f, and the reference character "i" denotes a sinusoidal wave obtained after processing the composite wave h using a bandpass filter in the receiver unit.

Even when a wave obtained after filtering an input wave has a phase difference from that of the input wave due to processing speed and delay characteristics of an amplifying circuit and a bandpass filter circuit used, there is no problem in accordance with the present invention. This is because all waves used are filtered using a single filtering circuit in accordance with the present invention, so that all filtered waves exhibit the same phase difference. That is, phase shifts occurring in association with the reference phase signal and position designating phase signal for position detection exhibit the same phase difference. Accordingly, there is no error in accordance with the present invention because a relative difference between the reference phase and the composite phase for position detection, which are received in the receiver unit, is used.

Figure 9:
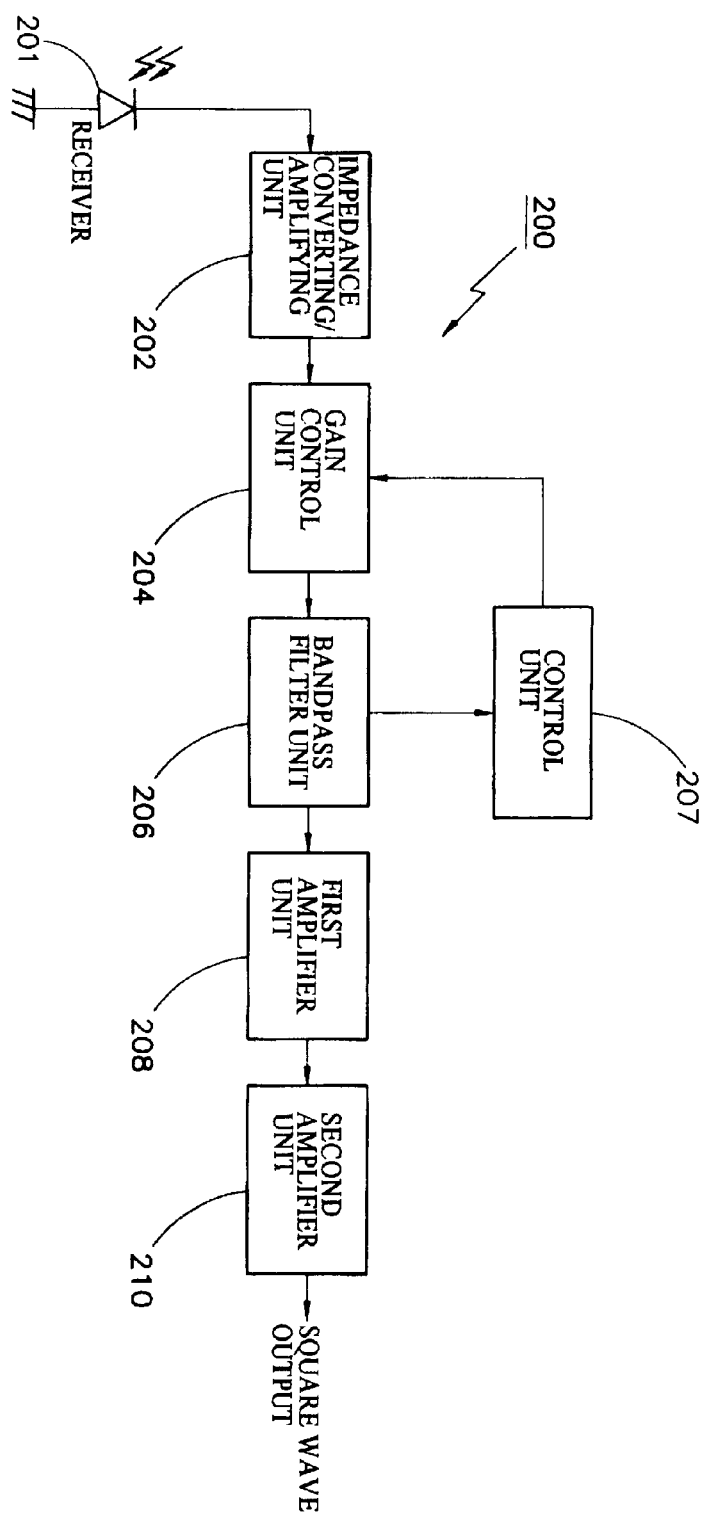
FIG. 9 is a block diagram illustrating an amplifying unit included in a receiver unit of the remote position designation system according to the present invention.

FIG. 9 is a block diagram illustrating the configuration of an amplifying unit of the receiver unit included in the rotate position designation system according to the present invention. As shown in FIG. 9, the amplifying unit, which is denoted by the reference numeral "200", includes an infrared receiver 201 grounded at one terminal thereof, and an impedance converting/amplifying unit 202 coupled to the other terminal of the infrared receiver 201 and adapted to amplify a signal, having an intensity lower than that of ambient natural light, received from the transmitter unit while reducing loss of the received signal during the amplification. The amplifying unit 200 also includes a gain control unit 204 adapted to remove noise from the amplified signal outputted from the impedance converting/amplifying unit 202 while amplifying AC components of the amplified signal, a bandpass filter unit 206 adapted to filter an output signal from the gain control unit 204, thereby outputting desired frequency components of the received signal, and a control unit 207 adapted to control the gain control unit 204 based on the frequency components outputted from the bandpass filter unit 206, thereby controlling an amplification degree for the frequency components outputted from the bandpass filter unit 206. The amplifying unit 200 further includes a first amplifier unit 208 adapted to amplify the frequency components outputted from the bandpass filter unit 206, and a second amplifier unit 210 adapted to ultimately amplify an output signal from the first amplifier unit 208 to a saturation level, thereby outputting a square wave.

In accordance with the present invention, the signal processing for composite waves received in the receiver unit is carried out irrespective of the amplitudes of the received composite waves. This signal processing depends only on phase shifts of the received composite waves. Accordingly, there is no problem even when the received signal is ultimately amplified to a saturation level in the second amplifier unit 210.

Figure 10:
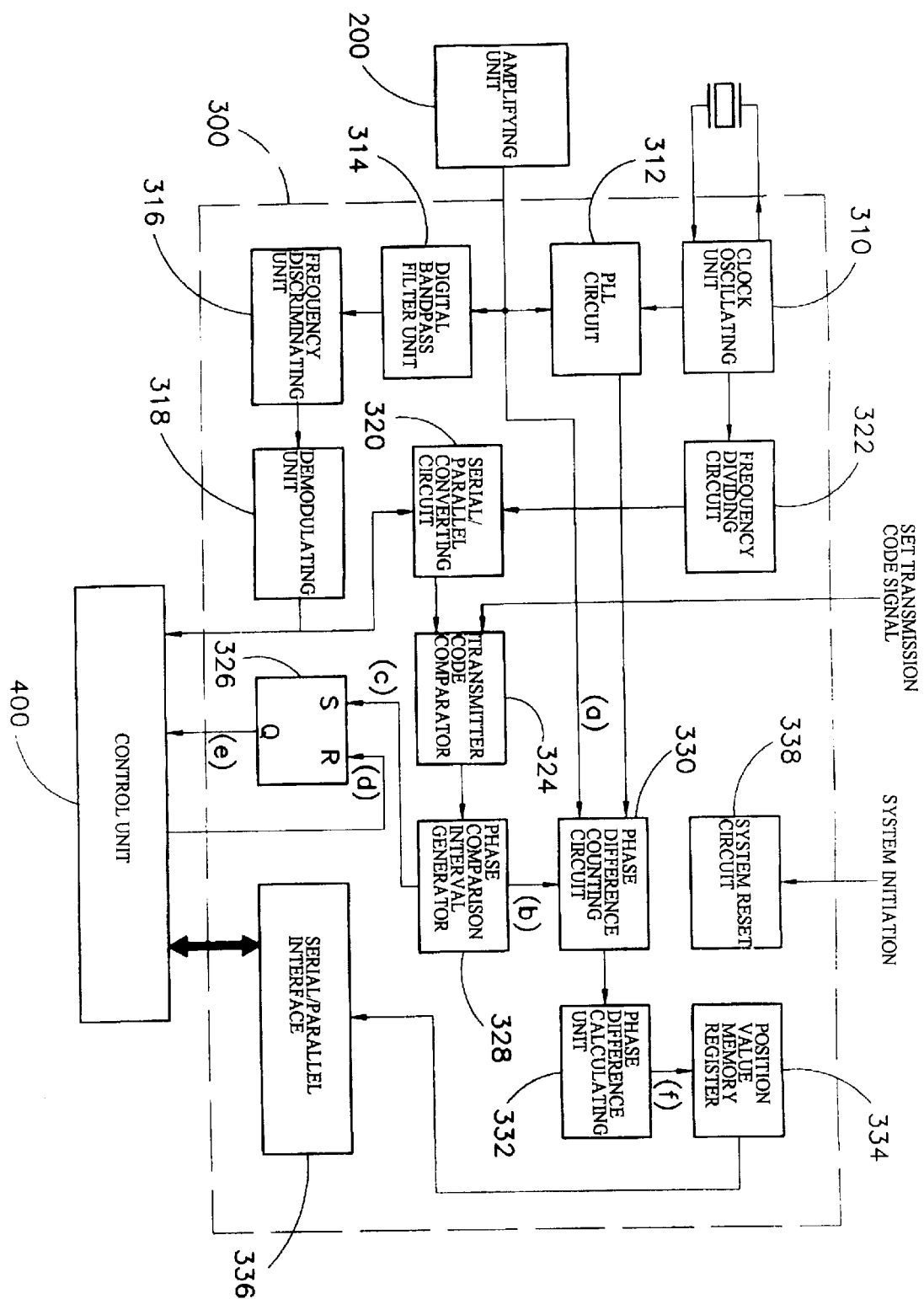
FIG. 10 is a block diagram illustrating a digital signal processing circuit included in the receiver unit of the remote position designation system according to the present invention.

FIG. 10 is a block diagram illustrating the configuration of a digital signal processing unit included in the receiver unit according to the present invention. The digital signal processing unit, which is denoted by the reference numeral "300" in FIG. 10, serves to completely conduct a phase shift measuring procedure. The digital signal processing unit is coupled to an output stage of the amplifying unit 200 to receive the square wave amplified to a saturation level as its input signal.

In FIG. 10, the reference numeral "310" denotes a clock oscillating unit adapted to generate clocks of a desired frequency, and the reference numeral "312" denotes a phase locked loop (PLL) circuit coupled to the output stage of the amplifying unit 200 to receive the square wave signal from the amplifying unit 200. The PLL circuit 312 serves to lock a reference signal in phase with the amplified input square wave signal at the starting point of a phase measurement interval. The PLL circuit 312 transmits a phase value of the reference signal to a phase difference counting circuit 330 at every rising edge of the input square wave signal as the phase value of a reference phase signal, left-right phase signal or upper-lower phase signal.

The clock oscillating unit 310 generates a clock and applies it to a frequency dividing circuit 322. An output signal from the frequency dividing circuit 322 is applied to a serial/parallel converting circuit 320 as described hereinafter.

In FIG. 10, the reference numeral "314" denotes a digital bandpass filter unit adapted to filter the square wave signal outputted from the amplifying unit 200. The reference numeral "316" denotes a frequency discriminating unit adapted to discriminate whether or not the counted value of a frequency counter is within a predetermined range corresponding to a carrier frequency, thereby discriminating whether or not the input square wave signal has a carrier frequency. The reference numeral "318" denotes a demodulating unit adapted to demodulate an output signal from the frequency discriminating unit 316, that is, a transmitter code and button codes contained in the input square wave signal, namely, the carrier signal. The demodulating unit 318 then applies the demodulated signal to the control unit 400. The serial/parallel converting circuit 320 is adapted to convert the demodulated signal outputted in the form of serial data from the demodulating unit 318 into parallel data in sync with a reference clock outputted from the frequency dividing circuit 322.

The reference numeral "324" denotes a transmitter code comparator adapted to compare an input transmitter code with a transmitter code previously set in the receiver unit. The reference numeral "326" denotes an R-S flip-flop for receiving an output signal from a phase comparison interval generator 328 at one input terminal thereof and a control signal from a control unit 400 at the other input terminal thereof, and outputting a signal generated based on the received signals to the control unit 400.

The phase comparison interval generator 328 generates an interval signal for measurement for position signals in response to an output signal from the transmitter code comparator 324. The phase difference counting circuit 330 is adapted to receive the input square wave signal received from the amplifying unit 200, an output signal from the PLL circuit 312, and the output signal from the phase comparison interval generator 328, and generates an integrated reference phase value, an integrated left-right phase value, and an integrated upper-lower phase value, based on the received signals.

The reference numeral "332" denotes a phase difference calculating unit for receiving the integrated phase values outputted from the phase difference counting circuit 330, thereby calculating a left-right phase difference and an upper-lower phase difference. The reference numeral "334" denotes a position value memory register for storing the calculated phase differences outputted from the phase difference calculating unit 332. The reference numeral "336" denotes a serial/parallel interface for conducting a serial/parallel processing for an output signal from the position value memory register 334, and applying the resultant signal to the control unit 400. The reference numeral "338" denotes a system reset circuit.

Now, the receiver unit having the above mentioned configuration will be described in conjunction with FIGS. 12 and 13.

Figure 12:
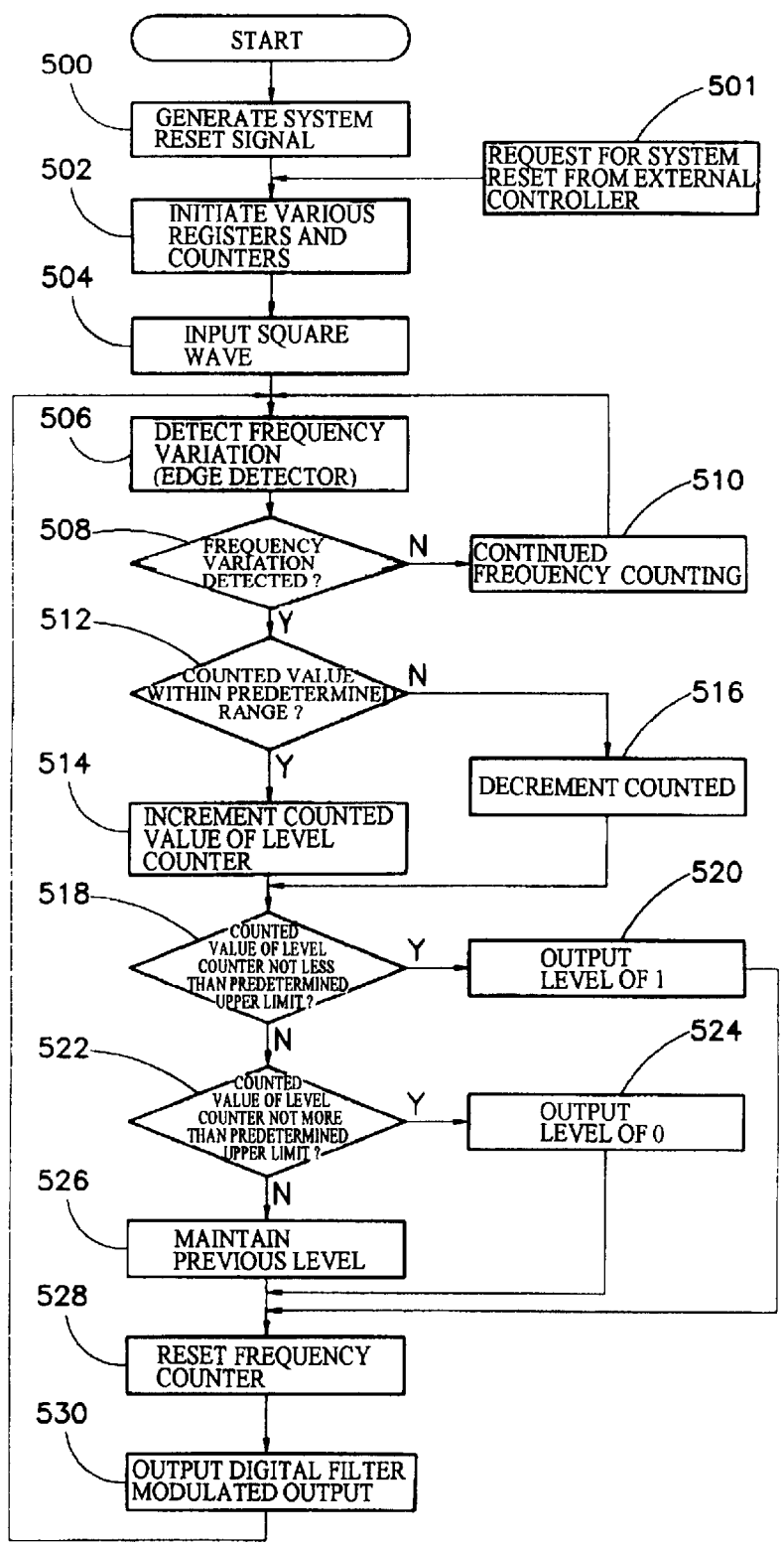
FIG. 12 is a flow chart illustrating a digital filtering and demodulating procedure conducted in the receiver unit of FIG. 10.

When power is applied to the receiver unit according to the present invention, the entire digital circuit thereof is initialized (Step 500), as shown in FIG. 12. That is, a system reset signal is generated. Based on the system reset signal, a variety of registers and counters included in the digital signal processing unit 300 are initialized (Step 502). This initialization procedure may be executed, based on a reset request signal from the control unit 400 outside the digital signal processing unit 300 (Step 501). When a square wave is inputted from the amplifying unit 200 in the above state (Step 504), the digital bandpass filter unit 314 detects a variation in the frequency of the input square wave (also, referred to as an "edge detection procedure") (Step 506). The digital bandpass filter unit 314 then determines whether or not the detected frequency variation is more than a predetermined value (Step 508). When it is determined at step 508 that there is a variation in frequency more than the predetermined value, the frequency discriminating unit 316 determines whether or not a counted value of the frequency counter is within a predetermined range (Step 512). On the other hand, when it is determined at step 508 that there is no frequency variation more than the predetermined value, the counting operation of the frequency counter is continued (Step 510). At the same time, the procedure returns to step 506 to repeat the phase state detection.

Where it is determined at step 512 by the frequency discriminating unit 316 that the counted value of the frequency counter is within the predetermined range, the counted value of a level counter is incremented (Step 514). On the other hand, when it is determined at step 512 that the counted value of the frequency counter is beyond the predetermined range, the counted value of the level counter is decremented (Step 516). In both cases, it is then determined whether or not the counted value of the level counter is not less than a predetermined upper limit (Step 518). Where it is determined that the counted value of the level counter is not less than the predetermined upper limit, a signal having a logic value of 1 is outputted (Step 520). Thereafter, a frequency counter resetting procedure is executed (Step 528). If the counted value of the level counter is less than the predetermined upper limit, it is then determined whether or not the counted value of the level counter is not more than a predetermined lower limit (Step 522). When it is determined that the counted value of the level counter is not more than the predetermined lower limit, a signal having a logic value of 0 is outputted (Step 524). In this case, the procedure proceeds to step 528 to execute the frequency counter resetting procedure. On the other hand, when it is determined at step 522 that the counted value of the level counter is more than the predetermined lower limit, the previously outputted logic value is maintained (Step 526). Then, the procedure proceeds to step 528 to execute the frequency counter resetting procedure. Following step 528, a procedure for outputting a digital filter demodulated signal is executed (Step 530).

The procedure for incrementing and decrementing the counted value of the level counter is a frequency discriminating procedure executed by the frequency discriminating unit 316 whereas the procedure for outputting the signal having a logic value of 1 and the signal having a logic value of 0 is a demodulating procedure executed by the demodulating unit 318. These frequency discriminating and level outputting procedures are similar to those conducted in conventional remote controllers. Accordingly, the functions of the conventional remote controllers can be incorporated in the system of the present invention without any problems.

Figure 13:
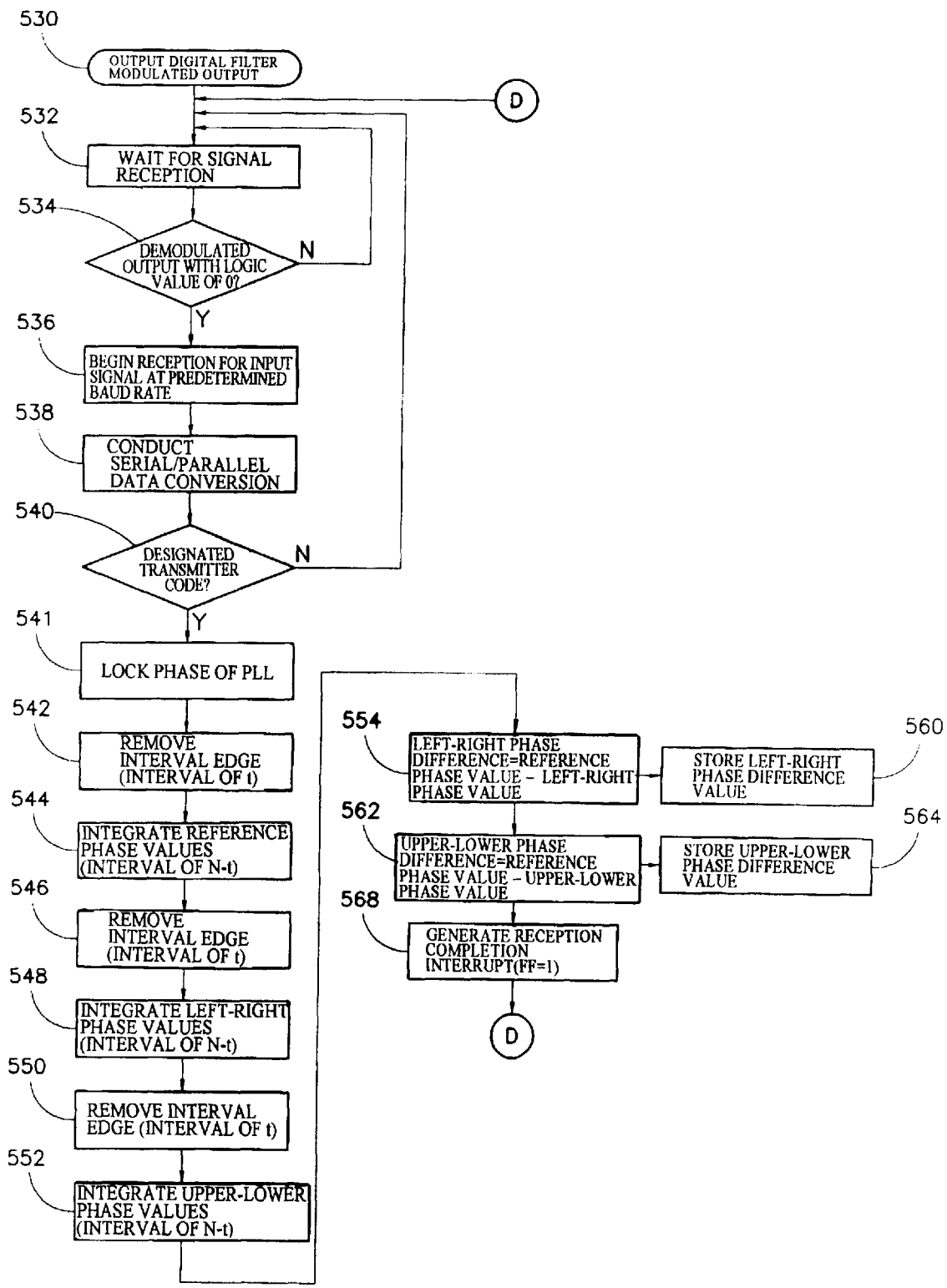
FIG. 13 is a flow chart illustrating a signal processing procedure conducted in the receiver unit of FIG. 10.

When the demodulating unit 318 outputs the above mentioned digital filter demodulated signal, the receiver unit is in a waiting state for reception of signals (Step 532), as shown in FIG. 13. The serial/parallel converting circuit 320 then determines whether or not the demodulated signal has a logic value of 0 (Step 534). This determination is to determine whether or not the most significant bit of the input signal from the transmitter has a low logic value. Typically, when there is no demodulated signal, a signal having a logic value of 1 is generated as a demodulated signal. Accordingly, the logic "0" state of a demodulated signal corresponds to a state in which there is a demodulated output. When it is determined at step 534 that the demodulated signal has a logic value of 0, a reception for the input signal is begun at a predetermined baud rate (Step 536). The received signal having the form of serial data is then converted into parallel data by the serial/parallel converting circuit 320 (Step 538). The transmitter code comparator 324 compares the parallel data with a set transmitter code signal. That is, it is determined whether or not the parallel data corresponds to the set transmitter code (Step 540). Where the parallel data does not correspond to the set transmitter code, the procedure returns to step 532 in which the receiver unit is in a waiting state for reception of signals. On the other hand, when the parallel data corresponds to the set transmitter code, a phase locking of the PLL circuit 312 is executed (Step 541). Thereafter, a signal boundary interval between adjacent edges of adjacent intervals, that is, a reference phase interval and an interval preceding the reference phase interval, in the parallel data is removed by the phase comparison interval generator 328 (Step 542). For the resultant reference phase interval (namely, an interval of N–t), a reference phase is calculated several times. The calculated values for the reference phase are then integrated (Step 544). Thereafter, a signal boundary interval between adjacent edges of the reference phase interval and left-right phase interval in the parallel data is removed by the phase comparison interval generator 328 (Step 546). For the resultant left-right phase interval (namely, an interval of N–t), a left-right phase is calculated several times. The calculated values for the left-right phase are then integrated (Step 548). Then, a signal boundary interval between adjacent edges of the left-right phase interval and upper-lower phase interval in the parallel data is removed by the phase comparison interval generator 328 (Step 550). For the resultant left-right phase interval (namely, an interval of N–t), an upper-lower phase is calculated several times. The calculated values for the upper-lower phase are then integrated (Step 552).

Thereafter, a left-right phase difference is calculated by subtracting the integrated left-right phase value from the integrated reference phase value (Step 554). This left-right phase difference is stored in the register as a left-right phase difference value (Step 560). An upper-lower phase difference is also calculated by subtracting the integrated upper-lower phase value from the integrated reference phase value (Step 562). This upper-lower phase difference is stored in the register as an upper-lower phase difference value (Step 564). Thereafter, the phase comparison interval generator 328 generates a reception completion interrupt signal (Step 568). This reception completion interrupt signal from the phase comparison interval generator 328 is applied to the R-S flip-flop 326 as a set signal. In response to the reception completion interrupt signal, the digital processing unit 300 is switched to a reception waiting state.

Figure 14:
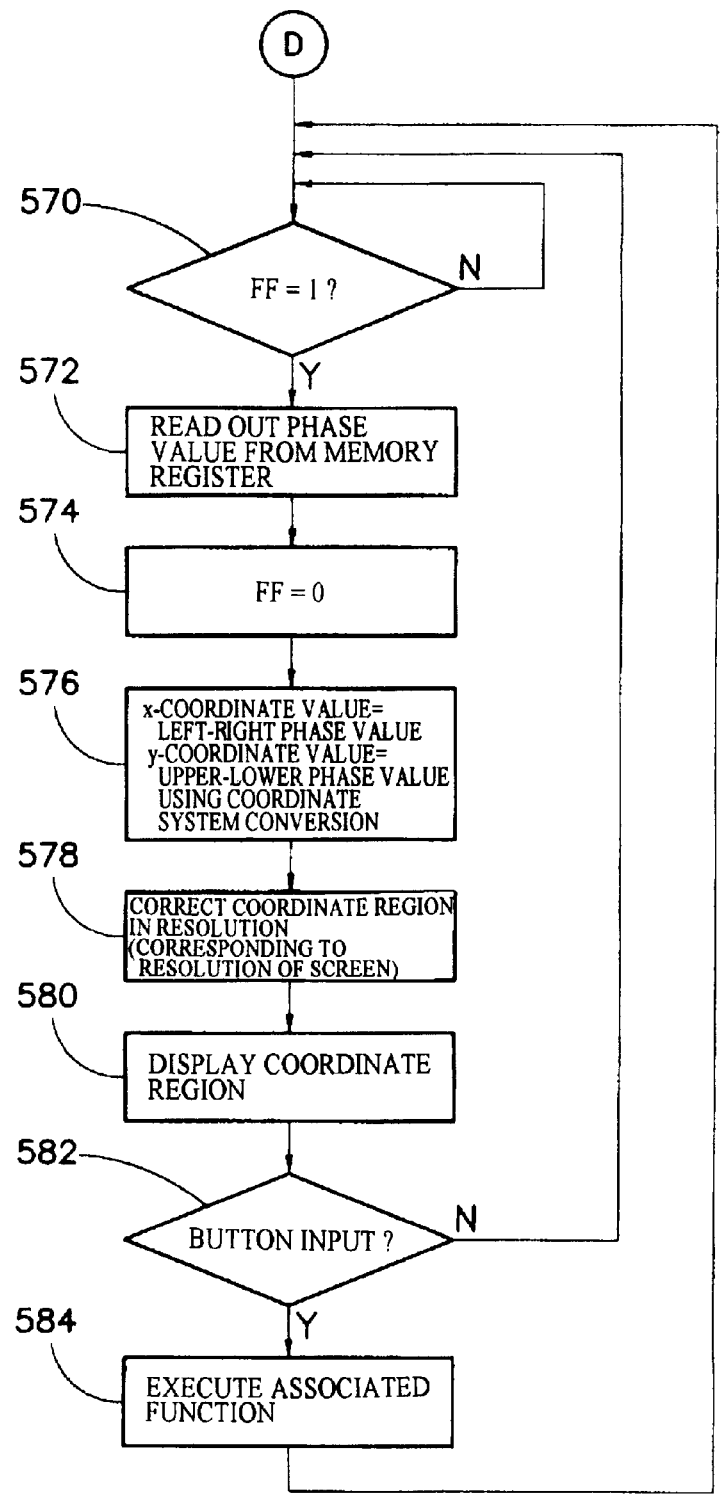
FIG. 14 is a flow chart illustrating an operation of a control unit included in the remote position designation system after generation of a reception completion interrupt signal in the procedure of FIG. 13.

FIG. 14 is a flow chart illustrating a control operation of the control unit 400 carried out in response to the reception completion interrupt signal generated in the procedure of FIG. 13. As shown in FIG. 14, the control unit 400, which is maintained in a state checking the state of the R-S flip-flop 326, determines whether or not the R-S flip-flop 326 is in a set state in which an output signal having a logic value of 1 is generated (Step 570). Where it is determined at step 570 that an output signal having a logic value of 1 is generated from the R-S flip-flop 326, the control unit 400 reads out data stored in the position value memory register 334. Thereafter, the control unit 400 resets the R-S flip-flop 326 (FF=0) (Step 572).

The control unit 400 then conducts a coordinate system conversion based on the left-right phase value and upper-lower phase value read from the register 334, thereby deriving X and Y-coordinate values, respectively (Step 576). Thereafter, a resolution correction for a coordinate region designated by the derived X and Y-coordinate values is executed in order to make the resolution of the coordinate region correspond to the resolution of the screen (Step 578). The coordinate region is then displayed (Step 580). Subsequently, it is determined whether or not there is a button input from the transmitter unit (Step 582). Where there is a button input from the transmitter unit, a function associated with the button input is executed (Step 584). Where there is no button input, the procedure returns to step 570 in order to determine whether or not the R-S flip-flop 326 is in its set state.

Figure 11:
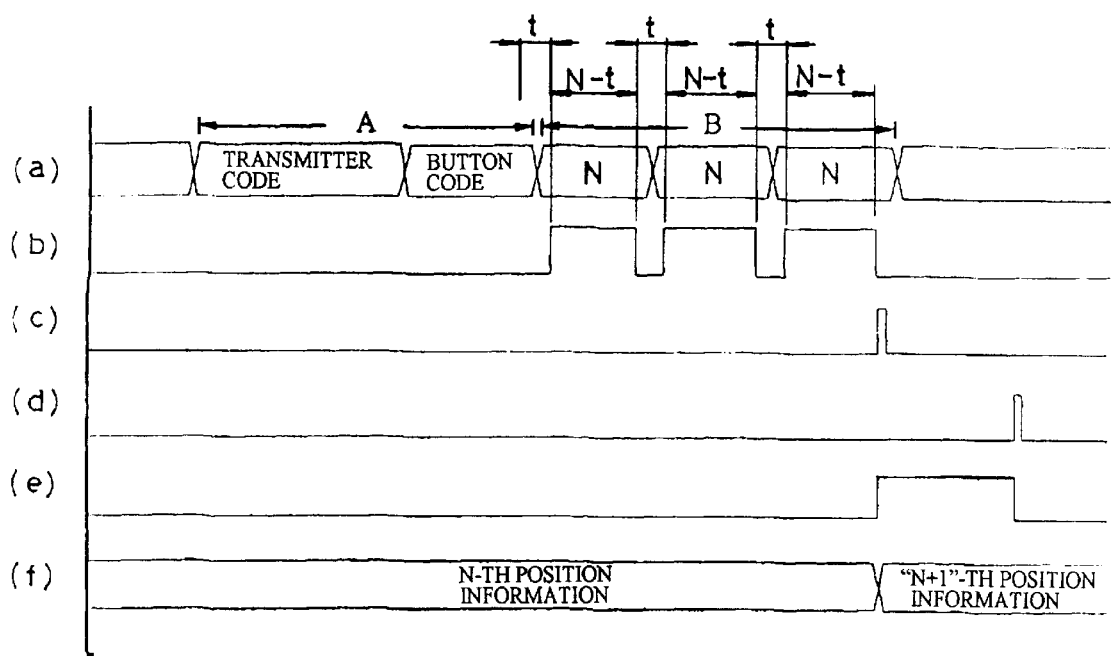
FIG. 11 is a timing diagram of signals used for a transmitter code comparison and a phase measurement.

FIG. 11 is a timing diagram of signals used for a transmitter code comparison and a phase measurement. In FIG. 11, the reference character "a" denotes a signal outputted from the amplifying unit 200 of FIG. 9. The signal a has a signal interval A for determining an associated transmitter and a signal interval B for measuring a variation in phase. As shown in FIG. 11, the signal interval A for a transmitter determination is divided into two intervals, that is, a remote controller recognition code interval and a button code interval. The signal interval B for measurement of a variation in phase is divided into three intervals, that is, a reference phase signal interval for measurement of a reference phase, a horizontal position phase signal interval for measurement of horizontal-axis position information, and a vertical position phase signal interval for measurement of vertical-axis position information. In FIG. 11, the reference character "t" denotes a signal boundary interval between adjacent edges of adjacent intervals.

In FIG. 11, the reference character "b" denotes a signal outputted from the transmitter code comparator 324. The signal b has intervals respectively corresponding to the signal intervals A and B of the signal a. The reference character "c" denotes a setting signal applied from the phase comparison interval generator 328 to the R-S flip-flop 326 at the point of time when the phase variation measurement interval B of the signal b from the transmitter code comparator 324 is completed.

In FIG. 11, the reference character "d" denotes a reset signal applied from the control unit 400 to the R-S flip-flop 326. The reference character "e" denotes a signal applied from the R-S flip-flop 326 to the control unit 400.

Also, the reference character "f" in FIG. 11 denotes an output signal from the phase difference calculating unit 332. The signal f is a data signal associated with position information applied to the position value memory register 334.

As apparent from the above timing diagram, the digital signal processing unit 300 sets its internal R-S flip-flop 326 at the point of time when the phase measurement is completed ("c" in FIG. 11), transmits the resultant signal outputted from the R-S flip-flop 326 to an external system (the control unit 400 in the illustrated case) to allow all control circuits of the system to be informed of the completion of the measurement of new position information, that is, the completion of position information update ("e" in FIG. 11), and simultaneously stores the measured value in the position value memory register 334 ("f" in FIG. 11) to avoid loss of data during a next measurement for values subsequently received.

The control unit 400 reads out data stored in the position value memory register 334 at the point of time when it is identified that measurement of new position information is completed. Simultaneously, the control unit 400 resets the R-F flip-flop 326 in order to allow the completion of the measurement for new data to be identified again. The measured values from the position value memory register 334 are sent to the control unit 400 via the serial/parallel interface 336. The control unit 400 conducts a conversion for the received measured values using a coordinate system, thereby displaying the measured values on the screen 2.

Although the control unit 400 has been illustrated as being internally included in the receiver unit, it may be configured to constitute an external microcomputer circuit or an external system directly connected to a personal computer.

In accordance with the illustrated embodiment of the present invention, the phase measurement conducted in each measurement interval utilizes an integration method involving measuring the phase of an input signal several times, and calculating an average value of the measured phase values to reduce errors in the phase measurement. This is because when a phase comparison is conducted based on a value obtained by measuring the phase of the input signal only one time, a degradation in the measurement accuracy may occur due to an influence of noise, so that the measured value may involve errors.

As apparent from the above description, left and right signals or upper and lower signals are simultaneously received using a single infrared receiver in accordance with the illustrated embodiment of the present invention. Accordingly, square waves respectively having sine and cosine phases are received in a state in which their amplitudes vary depending on the directional angles of associated transmitters in such a fashion that they are different from each other due to the directional characteristics of the transmitters. A combined square wave of the input square waves having varied amplitudes is received in the receiver unit which, in turn, conducts amplification, filtering and saturation processes for the received combined square wave input, thereby obtaining a square wave having the same phase as that of a sinusoidal wave designated by the reference character "h" in FIG. 8h.

As apparent from the above description, the remote position designation system of the present invention has a relatively simple circuit configuration using a considerably reduced number of optical devices. Accordingly, it is possible to achieve an improvement in performance and an improvement in signal/noise (S/N) ratio. This results in a miniaturization of the remote position designation system along with a reduction in costs. The remote position designation system of the present invention also has an advantage of a convenience in use in that transmission and reception of position information can be simply achieved in a radio fashion in accordance with a manipulation conducted by the user to simply direct the transmitter unit to a target position. The remote position designation system of the present invention is also compatible with conventional remote controllers using carrier frequencies in terms of communications. Accordingly, the remote position designation system of the present invention can be used as a substitute for conventional remote controllers having no position designation function. Furthermore, the remote position designation system of the present invention can have the functions of conventional remote controllers without any circuit modification.

Thus, the remote position designation system of the present invention provides a convenience in use in that an optional position on a plane is easily designated in accordance with a movement of a curser, like as the emission trajectory of light emitted from a moving flashlight.

In accordance with the present invention, a variety of position display methods may be used. For example, an absolute coordinate display method may be used in which an optional position on a plane can be designated, based on a single transmission of position signals. Alternatively, a relative coordinate system display method may be used in which the current position is determined by adjusting the phase variation of an input signal associated with the current position, based on the previous position.

In accordance with the present invention, the receiver unit of the remote position designation system does not conduct a wave detection in an analog fashion, but conducts a wave detection and demodulation in a digital fashion by measuring the frequency of an input signal in accordance with a digital signal processing while using a frequency counter conducting a frequency division for a reference clock. Accordingly, the present invention provides a signal processing device conducting a demodulation capable of allowing the remote position designation system to be compatible with conventional remote controllers.

Although the remote position designation system of the present invention has been described as using infrared transmitters and an infrared receiver, it may use other transmission/reception configurations. For example, ultrasonic transmitter/receiver units or RF transmitter/receiver units may be used.

In accordance with the present invention, it is unnecessary to use a precise amplifier requiring a linearity. No or little circuit correction associated with a variation in temperature is required. In addition, the remote position designation system of the present invention has a reduced effect resulting from noise.

As apparent from the above description, the present invention provides a remote position designation system having an integrated circuit configuration requiring no complex and specific amplifying circuits or mechanisms, thereby being capable of achieving a reduction in costs and an improvement in performance. The remote position designation system of the present invention is also compatible with conventional remote controllers in terms of signal processing and mechanisms. This may enable an integration of the remote position designation system to conventional remote controllers while eliminating common mechanisms and circuit portions. The remote position designation system of the present invention also has considerably reduced affects on performance under severe noise conditions because it has a superior ability capable of distinguishing position signals from noise. Accordingly, a superior performance in position designation is obtained.

The remote position designation system of the present invention can be applied to a variety of electronic appliances such as TVs, computers, VCRs, LDPs, DVD players, VOD systems, cable TV terminals, communication terminals, video game machines for home use, and computers for toddlers. In this case, an easy movement of a curser can be achieved.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A remote position designation system for designating an optional position on a plane at a place remote from the plane comprising:

a transmitter unit including transmitters adapted to transmit, as a position signal, signals of the same frequency, but having different phases, in a simultaneous fashion, respectively, said transmitter unit comprising:

a switch input unit for outputting an input signal in accordance with a switching operation thereof;

a transmitting-end control unit for generating a control signal, based on an output signal from the switch input unit;

a clock frequency divider for generating a clock of a predetermined frequency under a control of the transmitting-end control unit;

a square wave generating unit for generating square waves respectively having a sine waveform and a cosine waveform in response to the clock generated from the clock frequency divider;

a selection unit for receiving the sine and cosine square waves from the square wave generating unit, and outputting a selected one of the received square waves under a control of the transmitting-end control unit;

a distribution unit for receiving one of the square waves from the square wave generating unit along with the selected square wave from the selection unit, and outputting the received signals in the form of distributed signals under a control of the transmitting-end control unit;

a current amplifying unit for amplifying the distributed signals from the distribution unit; and the transmitters for transmitting frequency signals respectively based on the amplified signals from the current amplifying unit, the transmitters being arranged at upper, lower, left and right positions, respectively;

a receiver unit for receiving the signals transmitted from the transmitters of the transmitter unit in the form of a composite signal, amplifying the received composite signal to a saturation level, and conducting a signal processing for the amplified signal to obtain position information associated with a phase shift of the amplified signal from a reference phase; and a control unit for generating a control signal adapted to display a position designated by the position signal from the transmitter unit on a screen, based on the position information from the receiver unit.

2. The remote position designation system in accordance with claim 1, wherein the transmitting-end control unit generates a reference clock control signal, a square wave oscillation control signal, a transmitter waveform selection control signal for the left and right transmitters, a transmitter waveform selection control signal for the left, right, upper and lower transmitters, a control signal for a timer adapted to count a set period of time, and a control signal for a sleep controller adapted to generate a control signal in response to a timing signal generated from the timer.

3. The remote position designation system in accordance with claim 1, wherein the square wave generating unit comprises a sine-phase square wave generating unit and a cosine-phase square wave generating unit, each of which is activated by a control signal from the transmitting-end control unit applied to an enable terminal thereof, to generate square waves respectively having a sine phase and a cosine phase in sync with the clock from the clock frequency divider received at input terminals thereof.

4. The remote position designation system in accordance with claim 1, wherein the receiver unit comprises:

an amplifying unit for receiving the frequency signals from the transmitter unit, and amplifying the received frequency signals; and a digital signal processing unit for processing an output signal from the amplifying unit in a digital fashion.

5. The remote position designation system in accordance with claim 1, wherein the transmitter and receiver units are of an infrared type.

6. The remote position designation system in accordance with claim 1, wherein the transmitter and receiver units are of an ultrasonic type.

7. The remote position designation system in accordance with claim 1, wherein the transmitter and receiver units are of a radio frequency type.

8. A remote position designation system for designating an optional position on a plane at a place remote from the plane comprising:

a transmitter unit including transmitters adapted to transmit, as a position signal, signals of the same frequency, but having different phases, in a simultaneous fashion, respectively;

a receiver unit for receiving the signals transmitted from the transmitters of the transmitter unit in the form of a composite signal, amplifying the received composite signal to a saturation level, and conducting a signal processing for the amplified signal to obtain position information associated with a phase shift of the amplified signal from a reference phase wherein the receiver unit comprises:

an amplifying unit for receiving the frequency signals from the transmitter unit, and amplifying the received frequency signals; and a digital signal processing unit for processing an output signal from the amplifying unit in a digital fashion;

an infrared receiver grounded at one terminal thereof;

an impedance converting/amplifying unit coupled to the other terminal of the infrared receiver and adapted to amplify a signal, having an intensity lower than that of ambient natural light, received from the transmitter unit while reducing loss of the received signal during the amplification;

a gain control unit adapted to remove noise from the amplified signal outputted from the impedance converting/amplifying unit while amplifying AC components of the amplified signal;

a bandpass filter unit adapted to filter an output signal from the gain control unit, thereby outputting desired frequency components of the received signal;

a control unit adapted to control the gain control unit based on the frequency components outputted from the bandpass filter unit, thereby controlling an amplification degree for the frequency components outputted from the bandpass filter unit;

a first amplifier unit adapted to amplify the frequency components outputted from the bandpass filer unit; and a second amplifier unit adapted to ultimately amplify an output signal from the first amplifier unit to a saturation level, thereby outputting a square wave.

9. A remote position designation system for designating an optional position on a plane at a place remote from the plane comprising:

a transmitter unit including transmitters adapted to transmit, as a position signal, signals of the same frequency, but having different phases, in a simultaneous fashion, respectively;

a receiver unit for receiving the signals transmitted from the transmitters of the transmitter unit in the form of a composite signal, amplifying the received composite signal to a saturation level, and conducting a signal processing for the amplified signal to obtain position information associated with a phase shift of the amplified signal from a reference phase wherein the receiver unit comprises:

an amplifying unit for receiving the frequency signals from the transmitter unit, and amplifying the received frequency signals; and a digital signal processing unit for processing an output signal from the amplifying unit in a digital fashion, wherein the digital signal processing unit comprises:

a clock oscillating unit adapted to generate a clock signal of a desired frequency;

a phase locked loop circuit for receiving the square wave signal from the amplifying unit, and serving to transmit a phase value of a reference signal to a phase difference counting circuit at every rising edge of the input square wave signal as the phase value of a reference phase signal, left-right phase signal or upper-lower phase signal;

a frequency dividing circuit adapted to conduct a frequency division in sync with the clock signal from the clock oscillating unit;

a digital bandpass filter unit adapted to filter the square wave signal outputted from the amplifying unit;

a frequency discriminating unit adapted to discriminate whether or not the counted value of a frequency counter for the square wave signal is within a predetermined range corresponding to a carrier frequency, thereby discriminating whether or not the input square wave signal has a carrier frequency;

a demodulating unit adapted to demodulate an output signal from the frequency discriminating unit;

a serial/parallel converting circuit adapted to convert the demodulated signal outputted in the form of serial data from the demodulating unit into parallel data in sync with an output signal from the frequency dividing circuit;

a transmitter code comparator adapted to receive an output signal from the serial/parallel converting circuit, thereby comparing an input transmitter code with a set transmitter code;

an R-S flip-flop for receiving an output signal from a phase comparison interval generator at one input terminal thereof and a control signal from a receiving-end control unit at the other input terminal thereof, and outputting a signal generated based on the received signals to the control unit;

the phase comparison interval generator adapted to generate an interval signal for measurement for position signals in response to an output signal from the transmitter code comparator;

a phase difference counting circuit adapted to receive the input square wave signal received from the amplifying unit, the output signal from the phase locked loop circuit, and the output signal from the phase comparison interval generator, thereby generating an integrated reference phase value, an integrated left-right phase value, and an integrated upper-lower phase value;

a phase difference calculating unit for receiving the integrated phase values outputted from the phase difference counting circuit, thereby calculating a left-right phase difference and an upper-lower phase difference;

a position value memory register for storing the calculated phase differences outputted from the phase difference calculating unit;

a serial/parallel interface for conducting a serial/parallel processing for an output signal from the position value memory register, and applying the resultant signal to the receiving-end control unit; and a system reset circuit for maintaining a reset state in response to a system reset control signal.

* * * * *